United States Patent
Jones et al.

[11] Patent Number: 6,141,341
[45] Date of Patent: *Oct. 31, 2000

[54] VOICE OVER INTERNET PROTOCOL TELEPHONE SYSTEM AND METHOD

[75] Inventors: Wesley Stuart Jones, Palatine, Ill.; Timothy Cotton, Huntsville; Robert Victor Holland, Madison, both of Ala.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/150,427

[22] Filed: Sep. 9, 1998

[51] Int. Cl.⁷ .................................................. H04L 12/66
[52] U.S. Cl. ........................................... 370/352; 370/356
[58] Field of Search ..................... 370/356, 260, 370/259, 351, 352–355, 338; 455/414, 416, 417, 413; 379/201, 202, 210, 219, 220, 221, 211, 212, 120, 140, 156, 258, 64, 65, 66, 106

[56] References Cited

U.S. PATENT DOCUMENTS 5,550,915  8/1996  Patridge, III ........................... 379/355
5,563,938  10/1996  Soshea et al. .......................... 379/201
5,726,984  3/1998  Kubler et al. .......................... 370/349

OTHER PUBLICATIONS

Press Release–InfoGear and CIDCO Launch the i Phone, infoGear Technology Corporation; Las Vegas, Nevada; Jan. 10, 1997.

WebPhone, NetSpeak Corporation; http:///k2nesoft.com/webphone.html; Jul. 21, 1996.

*Primary Examiner*—Ajit Patel
*Attorney, Agent, or Firm*—Heather L. Creps

[57] ABSTRACT

An Internet Protocol telephone system and method uses a telephone (26) to place and receive voice over Internet Protocol (VoIP)-based telephone calls and public switched telephone network (PSTN)-based telephone calls. An off-hook condition with the telephone (26) is detected and a sequence of signals generated by the telephone (26) is received. At least a first signal generated by the telephone (26) is buffered while the system attempts to detect a predetermined signal that signifies a VoIP-based call. Upon detection of the predetermined signal, the system intercepts subsequent signals in the sequence, absent the at least first signal that was buffered, and places the VoIP-based call via an internet (12). Otherwise, the system places the PSTN-based call via a PSTN (16).

8 Claims, 5 Drawing Sheets

VOICE OVER INTERNET PROTOCOL TELEPHONE SYSTEM AND METHOD

FIELD OF THE INVENTION

The present invention relates to a voice over Internet Protocol telephone system and method.

BACKGROUND OF THE INVENTION

Most current systems for Internet Protocol (IP) telephony or voice over an Internet Protocol (VoIP) are difficult and sometimes impractical to use. Since these systems are internet-based, they typically require the user to utilize his or her personal computer (PC) to connect to an internet server in order to place and receive internet-based calls. These PCs sometimes have a telephone connected to them, but often the user is left using the PC's speakers and microphone for the telephone conversation. Using the PC's speakers and microphone for such use is awkward and limits current user acceptability.

A solution to avoid using the PC to place and receive internet-based calls is to provide the user with a custom made telephone that supports VoIP-based telephone calls. A problem with this solution is that it requires the user to purchase additional telephone equipment to support the VoIP capabilities. As such, the user is forced into purchasing redundant telephone hardware equipment.

Thus, a need exists for a system and method that enables users to place and receive internet-based calls via the user's existing telephone equipment operating in its current fashion.

BRIEF DESCRIPTION OF THE DRAWINGS

A preferred embodiment of the present invention is now described, by way of example only, with reference to the accompanying drawings in which.

DETAILED DESCRIPTION OF A PREFERRED EMBODIMENT

The present invention implements a voice over Internet Protocol (IP) telephone system and method, suitable for whole-home and other uses, which enables customers to place and receive internet-based calls (i.e., voice over Internet Protocol (VoIP)) via the customer's existing plain old telephone service (POTS) telephone equipment operating in its current fashion. Such a configuration allows a user to utilize his existing POTS telephones to place and receive "standard" public switched telephone network (PSTN)-based calls as well as VoIP-based calls, thus preventing the user from purchasing redundant telephone hardware equipment.

Figure 1:
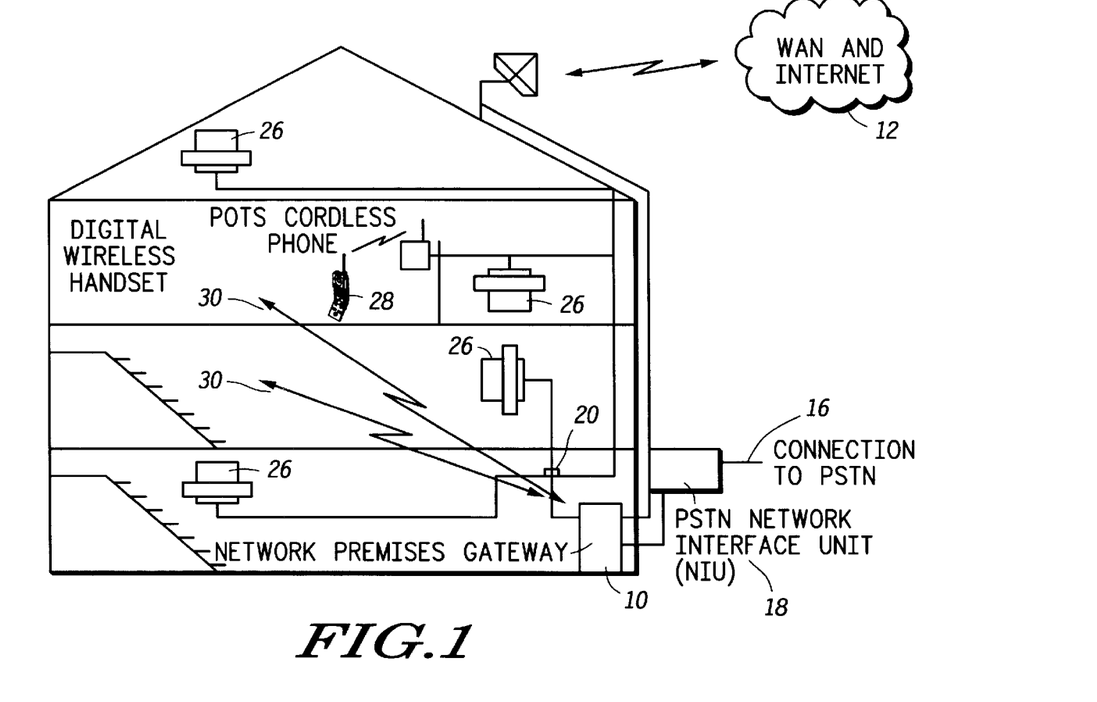
FIG. 1 illustrates a whole-home Internet Protocol (IP) telephone system using a network premises gateway according to the preferred embodiment of the present invention.

The preferred embodiment of the present invention supplies customers with broadband internet access in their home or business via a network premises gateway 10 as shown in FIG. 1. The whole-home IP telephone system with VoIP functionality and associated internet connectivity is embedded in the network premises gateway 10, thus allowing the network premises gateway 10 to enable access to the wide area network (WAN) and the internet 12.

Figure 2:
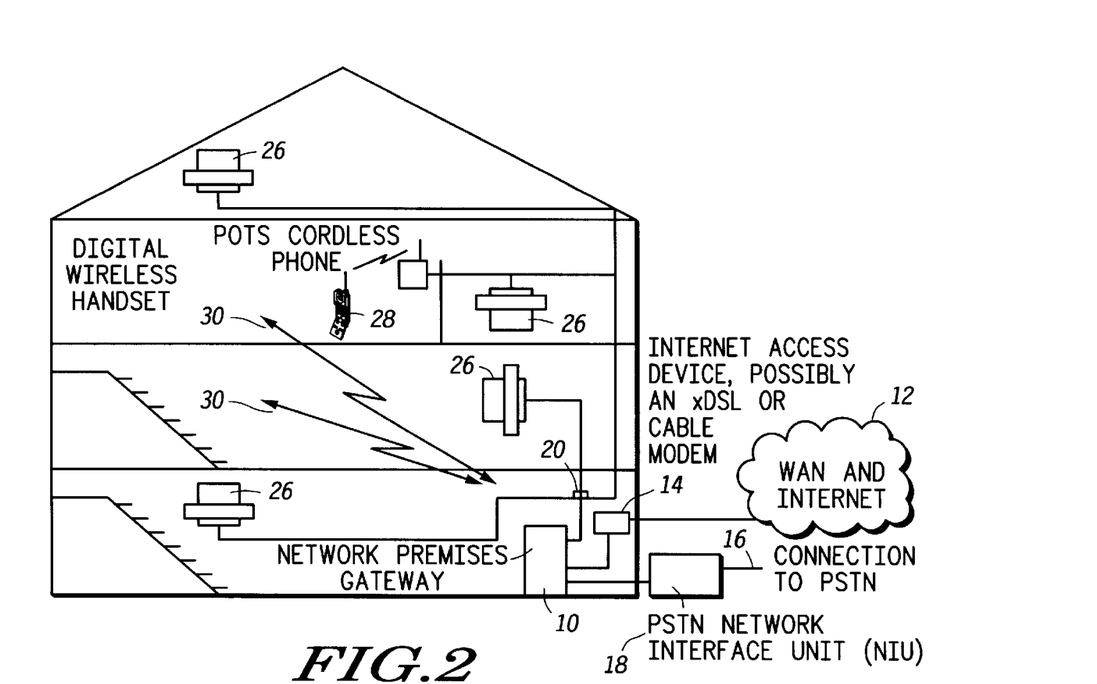
FIG. 2 illustrates the whole-home IP telephone system using a secondary internet access device and service provider to access the internet in an alternative embodiment of the present invention.

Alternatively, customers may also access the WAN and the internet 12 via another provider or service inside their home or business as shown in FIG. 2. In an alternative embodiment of the present invention, the network premises gateway 10 relies on the WAN and the internet 12 connectivity from an external and independent internet access device 14 (i.e., an integrated services digital network (ISDN) modem, a digital subscribe line (xDSL) modem, cable modem, etc.).

In the preferred embodiment, the network premises gateway 10 connects to a PSTN 16 via a PSTN network interface unit (NIU) 18. The PSTN NIU 18 is typically found on the outside of most homes in the United States. This is the demarcation point between the customer's equipment and the telephone company's equipment.

Figure 3:
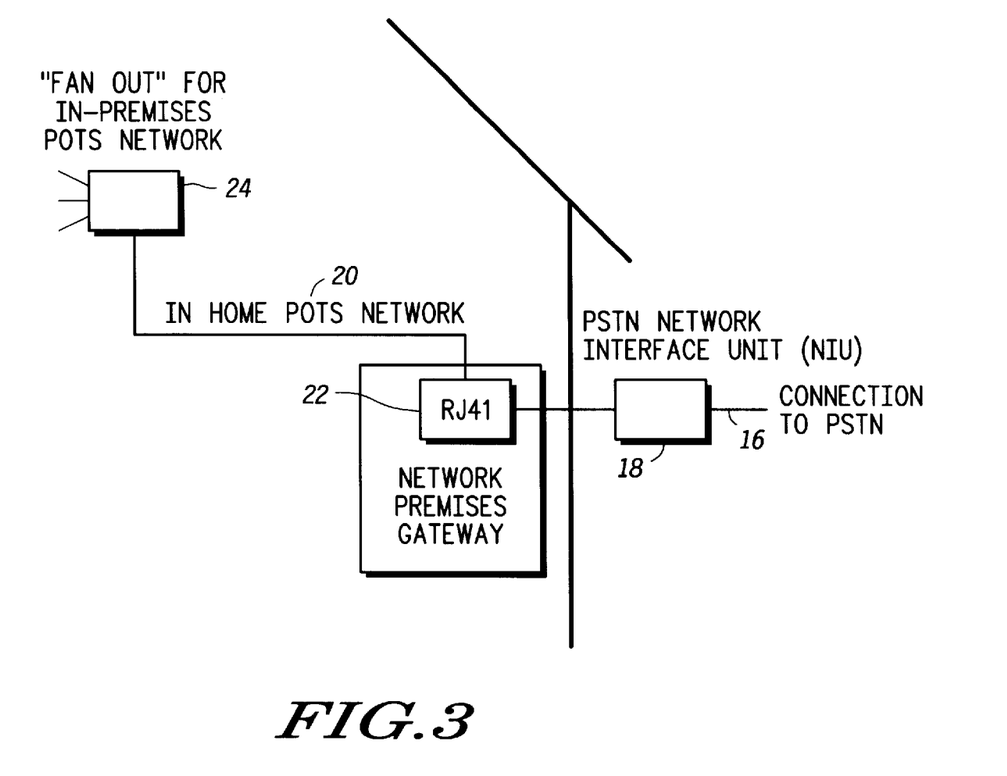
FIG. 3 illustrates the network premises gateway of FIG. 1 connected to a public switched telephone network and an in-premises plain old telephone service network according to the preferred embodiment of the present invention.

As shown in FIG. 3, the network premises gateway 10 also connects to an in-premises POTS network 20 via a RJ-41 type interface 22. The RJ-41 type interface 22 allows the network premises gateway 10 to arbitrate the in-premises POTS network 20 between "standard" PSTN-based calls and VoIP-based calls to and from the WAN and the internet 12.

The primary interfaces or networks in the network premises gateway 10 are the in-premises POTS network 20, the PSTN 16 and the broadband connection to the WAN and the internet 12. FIG. 3 illustrates an enlarged view of the primary interfaces and their associated connections used to connect the network premises gateway 10 to the PSTN 16 and the in-premises POTS network 20.

As shown in FIG. 3, the connection from the in-premises POTS network 20 leads to a "break out" box, a "fan out" box or a splitter 24 for the in-premises POTS network 20. Such a connection allows all the POTS telephones 26 in the premises to be accessible via the network premises gateway 10. It should be noted that the network premises gateway 10 implemented in the present invention can be configured to support multiple telephone lines for customers who currently have more than one analog telephone line in their home or business.

Further, it is important to note that the addition of a POTS cordless telephone 28 operates with and supports the features of the present invention. An analog-based POTS cordless telephone 28 has a wireless interface for connecting the cordless handset to an analog base or base station. The analog base or base station connects the POTS cordless telephone 28 to the in-premises POTS network 20 and to the network premises gateway 10. An existing POTS cordless telephone 28 may be digital over the air (e.g., a 900 MHz telephone), but the associated base station has a standard analog interface. Thus, the present invention does not preclude a POTS cordless telephone 28 from operating in its normal fashion.

Figure 4:
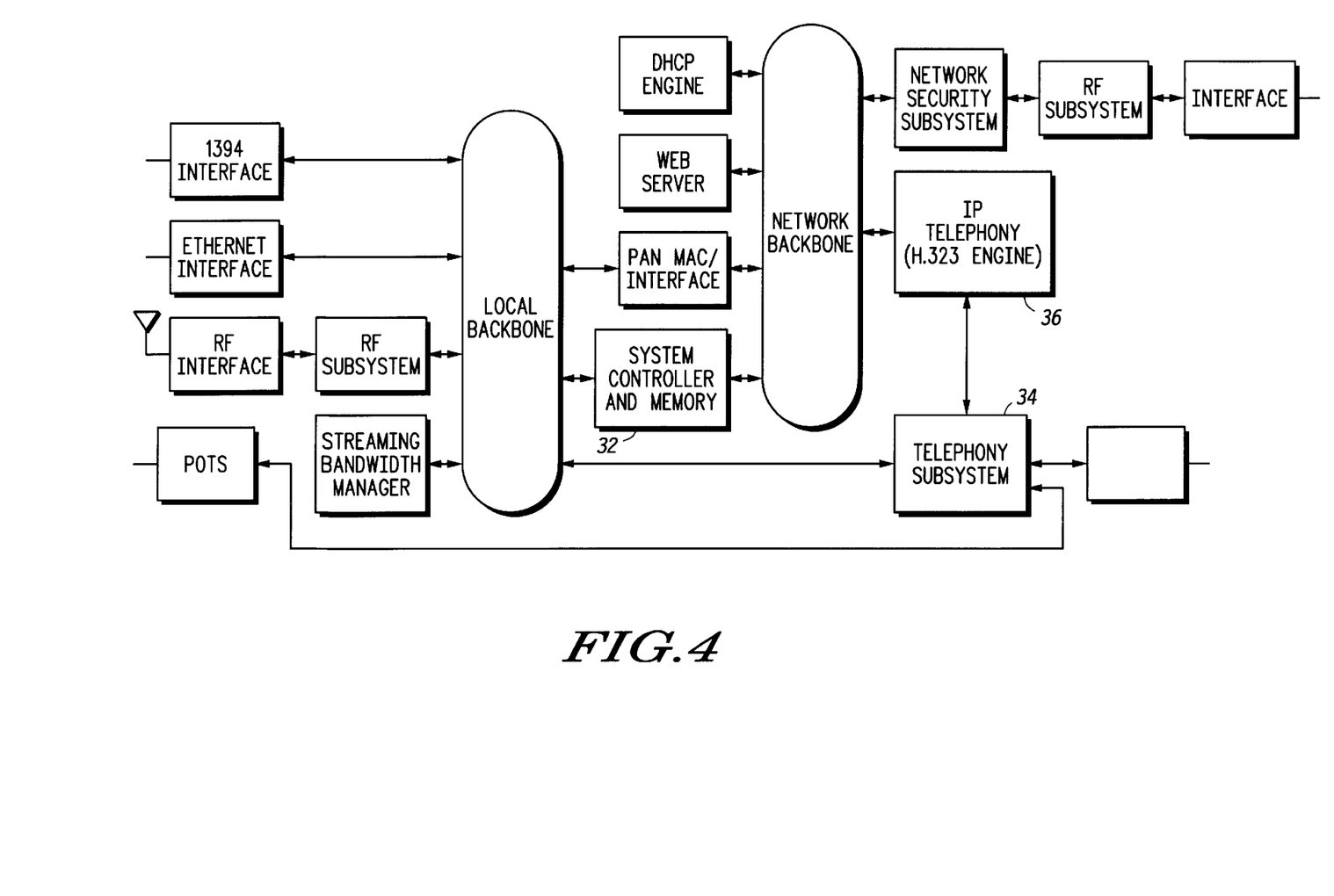
FIG. 4 illustrates a hardware block diagram of the network premises gateway of FIG. 1 according to the preferred embodiment of the present invention.

FIG. 4 illustrates a high level hardware block diagram of the network premises gateway 10. In the block diagram, there is a connection to the WAN and the internet 12 and support for a wireless network of wireless digital handsets 30 or devices (additional advantages of supporting the wireless network of wireless handsets 30 or devices are described in detail below). The components of interest in FIG. 4 are the system controller and memory component 32 and the telephony subsystem 34 and the IP telephony H.323 engine 36, which are described in detail below.

The system controller and memory component 32 controls the functions and operation of the network premises gateway 10. User interaction with the network premises gateway 10 is controlled by a user interface program which resides in and is executed on the system controller and memory component 32. The system controller and memory component 32 is designed to contain functions and operate in a manner similar to a standard microprocessor controlled computer system. The system controller and memory component 32 is the heart of the network premises gateway 10 and it controls all the network premises gateway's 10 functions, operations, and states.

The system controller and memory component 32 comprises a memory system (not shown), a comparator (not shown) and a microprocessor (not shown). The memory system buffers at least a first signal generated by the POTS telephone 26. The comparator attempts to detect a predetermined signal that signifies a VoIP-based call. The microprocessor and associated software program intercepts subsequent signals in the sequence, absent the at least first signal that was buffered, and places the VoIP-based call via an internet when the predetermined signal is detected.

Figure 5:
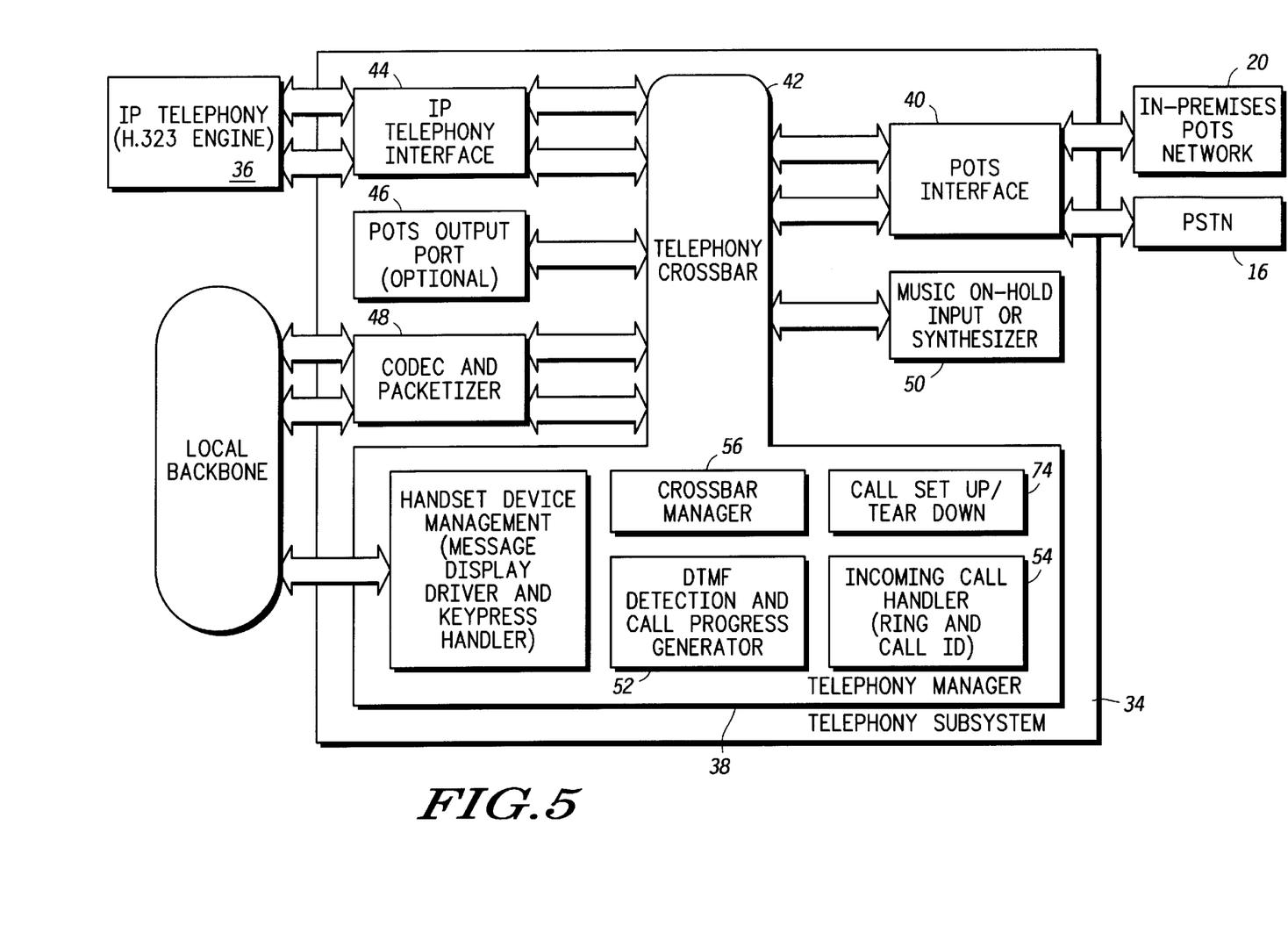
FIG. 5 illustrates a hardware block diagram of a telephony subsystem, which is a component of the hardware block diagram of FIG. 4, according to the preferred embodiment of the present invention.

FIG. 5 graphically illustrates the telephony subsystem 34. The telephony subsystem 34 comprises a telephony manager 38, a POTS interface 40 and a telephony crossbar 42. The telephony subsystem 34 also comprises other components, such as an IP telephony interface 44, a POTS output port 46 (used for connection of a local POTS telephone 26 to the network premises gateway 10), a compression-decompression engine (CODEC) and packetizer 48 and a music on-hold module 50. Although the telephony subsystem 34 comprises a multitude of components, the following description is limited to the telephony manager 38, the POTS interface 40 and the telephony crossbar 42.

The telephony manager 38 supplies all the functions for VoIP-based calls which are normally supplied by a switch in the PSTN 16 for POTS telephones 26. For example, the telephony manager 38 comprises a dual tone multi-frequency (DTMF) detection and call progress generator 52. The DTMF detection and call progress generator 52 comprises a detector for receiving a sequence of signals generated by the POTS telephone. In addition to performing DTMF detection, the DTMF detection and call progress generator 52 generates DTMF signaling and supplies dial tones and other appropriate call progress tones for the POTS telephones 26 when the network premises gateway 10 is operating. The incoming call handler 54 generates ringing for the POTS telephones 26 when signaled by the system controller and memory component 32.

Other features of the telephony manager 38 include: support for control of the telephony crossbar 42 via a crossbar manager 56 (described in detail below); DTMF generation and pulse dialing, flash hook, on/off-hook; and basic user interface for control of user interaction for VoIP answering and origination.

The POTS interface 40 contains the RJ-41 type interface 22 for connecting the network premises gateway 10 to the in-premises POTS network 20 and the PSTN NIU 18. The POTS interface 40 comprises a state detector for detecting an off-hook condition with the POTS telephone 26. The POTS interface 40 contains analog-to-digital converters (ADCs—which are not shown) for encoding the analog signals from the POTS telephones 26 to a digital sixty-four (64) kilobits per second pulse code modulation (PCM) for the telephony crossbar 42 and from analog signals via the PSTN 16 to the telephony crossbar 42. Likewise, the POTS interface 40 contains digital-to-analog converters (DACs—which are not shown) for decoding the digital sixty-four (64) kilobits per second (Kbps) PCM signals received from the telephony crossbar 42 for analog delivery to the POTS telephones 26 and from the telephony crossbar 42 for analog delivery to the PSTN 16. It should be noted that there is a set of DAC and ADC for each connection, i.e., to the in-premises POTS network 20 and to the PSTN 16 via the PSTN NIU 18.

The telephony crossbar 42 is the "spine" of the telephony subsystem 34; the telephony crossbar 42 couples the telephony manager 38 and the POTS interface 40 to each other. The telephony crossbar 42 is also a router for all telephony calls, PSTN and VoIP, alike. The telephony crossbar 42 routes the digitally encoded, sixty-four (64) Kbps PCM, audio signals to and from the POTS interface 40, IP telephony H.323 engine 36 and telephony manager 38 components at the direction of the crossbar manager 56.

The crossbar manager 56 contains an application specific integrated circuit (ASIC) for controlling the state and operation of the telephony crossbar 42. It should be noted that the ASIC could be replaced with a bus controller which is made up of an embedded microprocessor, memory and associated software residing on a single chip. The crossbar manager 56 maintains the data flow between the submodules of the telephony subsystem 34 across the telephony crossbar 42.

The crossbar manager 56 further has the ability to mute the signals and to inject music from a digital audio stream produced at the music on-hold synthesizer 50 for on-hold calls. Since the crossbar manager 56 contains input for the music on-hold module 50 for creating music, the user has the ability to place remote parties from the telephony call, either PSTN-based or VoIP-based, on hold, mute the signals and inject music from a digital audio stream produced at the music on-hold module 50. At the control of the user via the user interface, the system controller and memory component 32 enables the music on-hold module 50 and instructs the crossbar manager 56 to replace the sixty-four (64) Kbps PCM audio samples from the in-premises POTS network 20 with sixty-four (64) Kbps PCM audio samples from the music on-hold module 50. Such a replacement causes internal audio from the POTS telephones 26 to be muted (since these samples are no longer sent to the PSTN 16 or the internet 12 (for VoIP-based calls)) and replaced with music. Thus, the telephony crossbar 42 links the on-hold call with the music on-hold module 50 of the telephony subsystem 34, and sends this music to the remote party instead of audio digitized from the in-premises POTS telephones 26 or other telephony devices in the premises. In the event that the user prefers just muting the on-hold telephone call without music, the system controller and memory component 32 instructs the crossbar manager 56 to "drop" or disregard the sixty-four (64) Kbps PCM samples from the in-premises POTS network 20.

The telephony crossbar 42 can also combine audio signals from various sources for call conferencing, including conferencing PSTN-based calls with VoIP-based calls. The telephony crossbar 42 combines calls by sending multiple digital sixty-four (64) Kbps PCM streams to a common DAC in the POTS interface 40. Each DAC in the POTS interface 40 has associated circuitry (not shown) which sums the digital sixty-four (64) Kbps PCM streams into a single combined digital stream and automatically adjusts the single combined digital stream, via an automatic gain control (AGC) (also not shown), before the single combined digital stream enters the DAC. The AGC guarantees that the single combined digital stream remains within the dynamic range of the DAC. Sending multiple digital sixty-four (64) Kbps PCM streams to a common DAC causes audio from two telephone calls, VoIP based and PSTN-based, to be "added" together or combined, thus allowing call conferencing between multiple sources.

Figure 6:
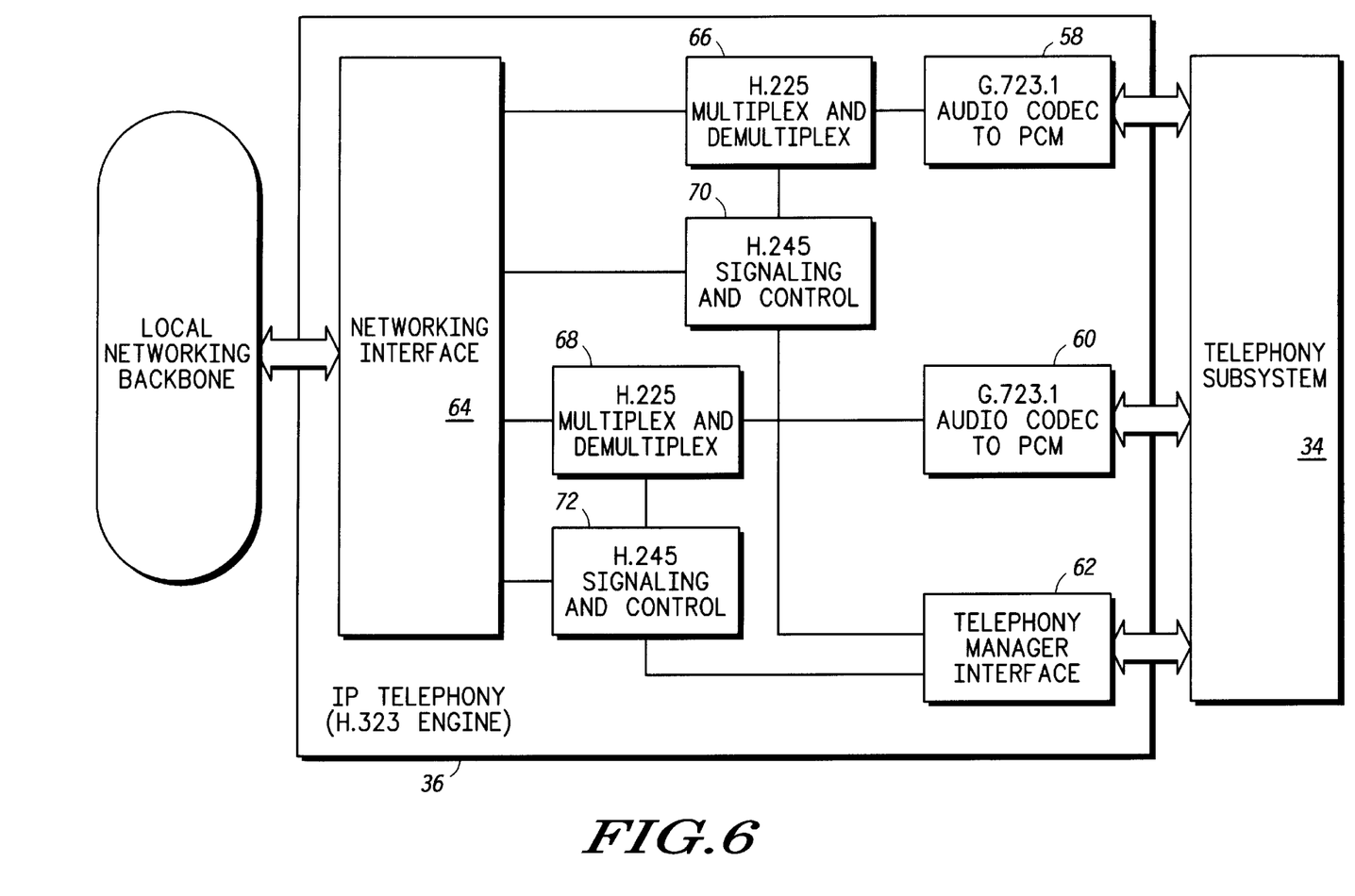
FIG. 6 illustrates a hardware block diagram of an IP telephony engine, which is a component of the hardware block diagram of FIG. 4, according to the preferred embodiment of the present invention.

The IP telephony H.323 engine 36 is a standard H.323 engine for supporting VoIP-based calls. The IP telephony H.323 engine 36 integrates the in-premises POTS telephones 26 to the broadband WAN and internet 12 connection which allows the POTS telephones 26 to place and receive VoIP-based calls. Likewise, the IP telephony H.323 engine 36 may be used to support wired or wireless IP devices 30 which support VoIP functionality (i.e., wireless IP devices which have a microphone, speaker and dialing pad) within the premises for PSTN-based and VoIP-based calls.

The IP telephony H.323 engine 36 converts sixty-four (64) Kbps PCM sampled, POTS audio signals into H.323 compliant audio streams for VoIP functionality. As graphically shown in FIG. 6, a G.723.1 audio CODEC to PCM 58, 60, telephony manager interface 62, networking interface 64, H.225 multiplex & demultiplex subsections 66, 68 and H.245 signaling and control subsections 70, 72 are the components for the IP telephony H.323 engine 36. Two blocks are shown in the figure for the components and functions described above, i.e., H.225 multiplex & demultiplex subsections 66, 68 and H.245 signaling and control subsections 70, 72. Two of each of these components are shown and described to demonstrate the support of multiple VoIP calls in one network premises gateway 10. There is a software program executing on the system controller and memory 32 which performs the H.323 standard-based functions for VoIP-based call setup and teardown, including but not limited to standard Q.931 signaling for call setup and initiate. The software program executing on the system controller and memory 32 controls the telephony manager interface 62 for managing, at the H.245 subsections 70, 72, and audio and stream control to provide service over non-guaranteed links (e.g., transmission control protocol (TCP)/IP). G.723.1 audio CODEC to PCM 62 performs the transcoding from sixty-four (64) Kbps PCM to 5.3 or 6.3 Kbps low bit rate audio.

In operation, the DTMF detection and call progress generator 52 performs DTMF functions on signals generated from a POTS telephone 26, sends a digital representation of the information to the system controller and -memory component 32 for buffering into memory, and replaces the PSTN dial tone on all POTS telephones 26 with a slightly modified dial tone (i.e., the audible characteristics, tone and/or pitch of the PSTN dial tone is altered) when a POTS telephone 26 is taken off-hook. The slightly modified dial tone reminds the user that he has the option of placing an internet-based call, thus indicating that the network premises gateway 10 is currently on-line. Should the network premises gateway 10 be shut-off or down, the user hears the PSTN supplied dial tone when a POTS telephone 26 is taken off-hook.

The telephony manager 38 also comprises an incoming call handler 54. The incoming call handler 54 supports PSTN call waiting notification during the presence VoIP calls and ring detection and generation with cadence information to the user. For example, the incoming call handler 54 signals the system controller and memory component 32 and DTMF detection and call process generator 52 which notifies the user of an incoming PSTN-based call when the present call is a VoIP-based call. The system controller and memory 32 is alerted via a standard H.323 alert message of an incoming VoIP call and signals the DTMF detection and call process generator 52 which notifies the user of 1) an incoming VoIP-based call when the present call is also a VoIP-based call; and 2) an incoming VoIP-based call when the present call is a PSTN-based call. Notifying the user of an incoming PSTN-based call when the present call is also a PSTN-based call is currently supported by the local telephone company.

In operation, during the presence of a call, the DTMF detection and call process generator 52 notifies the user of the incoming call by an audible tone that is user configurable, so that the user can ascertain whether the call is a PSTN-based call or a VoIP-based call. When no call is present, i.e., the POTS phones are on-hook, an incoming PSTN-based call and an incoming VoIP-based call is preferably programmed to have different ringing cadence, thus informing the user whether the incoming call is a PSTN-based or VoIP-based call based solely on the ringing cadence.

The system control and memory component 32 in forms the user of an incoming PSTN-based or VoIP-based call by transmitting the following: caller identification information (discussed in detail below); an electronic mail (email) message to a known user configuration address(es); or a telephony page from the PSTN 16 to a standard pager.

The system controller and memory component 32 is configurable, based on information from the incoming call handler 54 or receipt of H.323 alerts, to notify the user of an incoming electronic mail message, an incoming VoIP-based facsimile and an incoming PSTN-based facsimile in the same manner described above with respect to incoming PSTN-based and VoIP-based calls. For example, email message alerts are sent by having the remove email mailbox ping the network premises gateway 10, the system controller and memory component 32 would activate a program in the system and notify the incoming caller handler 54 on receipt of the ping from the email messaging system. The program or set of operations at the system controller and memory component 32 would instruct the call handler 54 to ring, with a special cadence, the POTS telephone 26 notifying the user of an email message arriving at the user's remote email mailbox. Internet mailboxes typically conform to known standards, e.g., simple mail transfer protocol (SMTP), post office protocol (POP), internet message access protocol (IMAP), etc. Most of these standards support notification based on receipt of email messages. In the event that a user has a non-standard mailbox, other systems can be designed that periodically check the mailbox and then send notification to the incoming call handler 54 based on the detection of new email messages in the mailbox. This assumes that a program resides on the system controller and memory component 32 for periodically checking whether new mail has arrived. This program is similar to the systems which are readily available to customers today, such as, biff and rbiff (UNIX daemons), PCBIFF (biff for Windows PCs), macbiff (biff for Macintosh systems) and the Windows PC program check mail.

Alternatively, the user configures the system so that the system controller and memory component 32 instructs the DTMF detection and call process generator 52 to use the PSTN 16 to send a "standard" telephony-based page on receipt of an email message. Once the system controller and memory component 32 detects the presence of new mail in the users mailbox a local program can instruct the DTMF detection and call progress generator 52 to initiate a new call to the PSTN 16. This call is to a user configured telephone number of a pager and then the system controller and memory component 32 sends pertinent, user configured, information to the pager. The information sent to the pager may include, but is not limited to, the sender of the email message, the subject/title of the message, and/or the message body.

With respect to email messages, the system controller and memory component 32 provides the following additional options to notify the user of an incoming email message: translating the content of the email message into a voice message for retrieval inside the premises (i.e., at any of the POTS telephones 26) or via dial up from a remote location (i.e., from any PSTN connection); or converting the content of the email message into a facsimile. Similar to the interface discussed with paging or ringing, the system controller and memory component 32 contains a program which integrates a text-to-speech processor (not shown but contained as software in the system controller and memory component 32 in a manner which computers generate speech today) to enable reading of the email message over the POTS telephones 26. For example, notification of the email message pings the system controller and memory component 32 and the system controller and memory component 32 instructs the incoming call handler 54 to ring the POTS telephone 26 (with a special cadence). If the user picks up the POTS telephone 26, the system controller and memory component 32 reads the email message to the user over the POTS telephone 26. It should be noted that a speech-to-text processor (not shown) could be integrated to perform the opposite function, speech-to-email message, from any POTS telephone 26 in the premises.

For example, the whole-home IP telephone system has memory, answers the incoming telephone calls, and stores messages from the calling party in the system memory, either PSTN-based or VoIP-based, in the event that no one is able to pick up the POTS telephone 26 or answer call with a digital handset 30 in the premises. In other words, the whole-home IP telephone system is integrated in a manner so that it operates as an answering machine for both PSTN-based and VoIP-based calls alike. Once a remote caller leaves a message on the system, the system controller and memory component 32 may be configured to access the WAN and internet 12 and send email messages based on the voice message that the calling party left. The email message is stored in the system memory of the system controller and memory component 32. Using speak-to-text capabilities which are readily available today, the message is encoded into text and included with the aforementioned email message.

Likewise, the network premises gateway 10 can be configured by the user to send a page notification based on a message that is left on an answering machine by the calling party. It is important to note that the voice mailbox is the same for both VoIP-based messages and "standard" voice messages from the PSTN. Sending a page notification based on a message that is left on an answering machine by the calling party operates just as paging on receipt of an email message.

With respect to facsimiles, either PSTN-based or VoIP-based, an optical character recognizer (either as a software system contained in the system controller and memory component 32 or as dedicated hardware, i.e., an ASIC) is integrated into the incoming call handler 54 to provide the following further options to notify the user of an incoming facsimile: translating via optical character recognition into a text message and further into a voice message for retrieval inside the premises or via a dial up from a remote location; or translating optical character recognition into a text message and further into an email message.

The incoming call handler 54 also supports caller identification in the same format that is known in the art. Caller identification information is passed as a 1200 baud, seven (7) data bits, one (1) stop bit encoded data stream for sending calling party information across the PSTN network for receipt and display at caller identification compatible devices. An example of a formatted output for caller identification compatible device as known in the art is the following:

Date—Feb. 28

Time—1:34 PM

Number—(407) 555-1111

Since the network premises gateway 10 implemented in the present invention interfaces between the in-premises POTS network 20 and the WAN and internet 12, the network premises gateway 10 receives VoIP-based calls and translates IP address information into a format that is compatible with the caller identification format above. Most of the VoIP, H.323-based calls contain more detail in their call state information (as will be described later), however, there are cases and times when the user wants to have a calling party's machine name looked up from the standard domain name services (DNS) available on the internet 12. In such a situation, look-ups for domain naming system is supported by containing a software system on the system controller and memory component 32 similar to nslookup, a standard UNIX command. For example, nslookup on "207.25.71.29" yields:

% nslookup 207.25.71.29

Name Server: argus.cso.uiuc.edu

Address: 128.174.5.58

Name: www9.cnn.com

Address: 207.25.71.29

In this example, the system controller and memory component 32 accesses the internet 12 and supplies the name "www9.cnn.com". The user is able to ascertain that the calling party is located at one of the CNN hyper text transfer protocol (http) servers. Since the called party in the VoIP scenario may only receive the IP address of the calling party, nslookup generates the name and the "standard" caller identification format is used to transmit the data to the in-premises caller identification device. The system controller and memory component 32 instructs the system to convert the data gathered from the DNS lookup to analog instructions compatible with standard caller identification functions. The system controller and memory component 32 instructs the DTMF detection and call progress generator 52 to translate the information to the analog modem codes, used for caller identification, and then the system controller and memory component 32 instructs the incoming call handler 54 to send the information on the POTS network 20 to compatible caller identification devices.

Further, more information is supplied by the IP telephony H.323 engine 36, which is received from the incoming H.323 VoIP-based call. This information is provided during the H.225.0 and Q.931 signaling and messaging functions as called for in the H.323 standard. For example, the IP telephony H.323 engine 36 has the ability to send additional subscriber (calling party) information (e.g., name, location, personal information, such as "finger" information). This information is translated and sent on the POTS network 20 and to compatible caller identification devices in the manner discussed above.

For the case where the calling party only allows the IP telephony H.323 engine 36 to distribute/broadcast the address of the originating call, the network premises gateway 10 performs a nslookup, or equivalent, and references the name and IP address against a database contained in the system controller and memory component 32 of the network premises gateway 10 in order to do a name look-up.

After the translation, the caller identification information is sent over the in-premises POTS network 20, at the time of ringing the POTS telephones 26 for an incoming VoIP call, in the standard and known analog caller identification format which is supported by caller identification systems available on the market today. This makes existing caller identification boxes and POTS telephones 26, which have integrated caller identification functions, compatible with the VoIP system.

In operation, when placing a call, the network premises gateway 10 via the DTMF detection and call progress generator 52 detects an off-hook condition with a POTS telephone 26. The DTMF detection and call progress generator 52 receives a sequence of signals generated by the POTS telephone 26 and buffers at least the first signal generated by the telephone. This technique is identical to that described in Newlin et al., U.S. patent application Ser. No. 08/735,295 filed Oct. 22, 1996, entitled Apparatus, Method and System for Multimedia Control and Communication, Motorola Docket Number PD05688AM. The DTMF detection and call progress generator 52 attempts to detect a sequence of predetermined signals call (e.g., the signals generated from the "#" keys of the POTS telephone 26) that signify a "non-standard" PSTN-based call, in this case a VoIP-based call. It should be noted that, alternatively, a single predetermined signal can signify a "non-standard" PSTN-based call as well.

When the sequence of predetermined signals is detected, the network premises gateway 10 enters a VoIP mode, intercepts subsequent signals in the sequence, absent the signals buffered, and places the VoIP-based call via the internet. Once in the VoIP mode, the network premises gateway 10 supports some form of dialing capability so that the user can dial an IP number directly. For example, the user could dial "192#98#18#83" which would signify the IP number "192.93.18.83". The system controller and memory component 32 interacts with the DTMF detection and call progress generator 52 to detect the numbers dialed and control H.323 engine for placing the internet-based call. The network premises gateway 10 may also support voice (computer-generated) menuing in order to make selecting of called users easier. All functions of the user interface would be controlled by the system controller and memory component 32.

When the sequence of predetermined signals is not detected, the network premises gateway 10 enters a POTS mode and transmits the sequence of signals, including the signals buffered, to the PSTN 16. The user interacts with the POTS telephone 26 and the PSTN 16 as normal.

As mentioned briefly previously, the addition of a wireless digital device or handset 30 (e.g., a personal digital assistant or any other digital device including a simple dedicated digital telephony handset) which supports telephony features via its own user interface and connects via a wireless link to the network premises gateway 10 provides the same features as above along with additional features to the present invention. Fundamentally, the present invention provides system integration to use a wireless digital handset for PSTN-based and VoIP-based calls via a common interface without having a separate CODEC exclusively for the VoIP-based calls.

The handset 30 is digital and the digital data is converted, at the network premises gateway 10, from sixty-four (64) Kbps PCM to low bit rate data for VoIP functionality without going to the analog domain. For example, when placing an outgoing call from the digital wireless handset 30, the digital wireless handset 30 receives a type-of-call selection and a sequence of signals representative of a telephone number to place the outgoing call following the type-of-call selection from a user. Analog signals (e.g., an electrical signal from a microphone generated by the speaker's voice) are converted to digital signals at the digital wireless handset 30 and transmitted to a network premises gateway 10. The digital signals are translated to a format compatible for a network used in completing the outgoing call at the network premises gateway 10, wherein the network is the PSTN 16 for PSTN-based calls and an internet 12 for VoIP-based calls. When receiving an incoming call at the digital wireless handset 30, digital signals are transmitted from the network premises gateway 10 to the digital wireless handset 30 and converted to analog signals at the digital wireless handset 30 in order to be broadcasted to the user via the digital wireless handset's speaker(s). Cost and complexity reduction is inherent to this design. The H.323 coding, i.e., call setup and management, is still performed at the network premises gateway 10 and does not need to be reproduced in the handset; however, the CODEC at the wireless digital handset 30 is used to convert between the analog and digital domains.

Integrating the wireless digital handset 30 which operates as a telephony cordless telephone with the WAN and internet 12 connection allows a user to access the configuration of the network premises gateway 10, and thus the characteristics of their WAN and internet connection 12, from their wireless digital handset 30. Moreover, as stated above, the user can access email messages from the wireless digital handset 30 without, however, going off-hook on the in-premises POTS network 20.

Caller identification could be provided at the wireless digital handset 30 for VoIP calls as described above as well. With a wireless digital handset 30, however, caller identification information would not have to be converted into analog telephone signals, in other words, a proprietary digital caller identification could be utilized for the digital handsets. The caller identification information is sent directly to the wireless digital handset 30 via the IP protocol.

The whole-home IP telephone system is configured in a manner so that if the network premises gateway 10 is shut off or in a crashed state, the in-premises POTS network 20 operates exactly as if the network premises gateway 10 was not installed. Such a configuration allows the RJ-41 interface 22 and the interface to pass PSTN-based calls on the PSTN connection 16 to ensure that PSTN-based calls are placed and received even when the network premises gateway 10 is disconnected. Thus, the present invention maintains the reliability and availability of the PSTN 16.

While the invention has been described in conjunction with a specific embodiment thereof, additional advantages and modifications will readily occur to those skilled in the art. Moreover, even though the present invention has been designed to support the H.323 standard for VoIP functionality, the network premises gateway 10 can also be designed to support other, possibly proprietary, VoIP functionality techniques. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In an Internet Protocol telephone system using a telephone to place and receive voice over Internet Protocol (VoIP)-based and public switched telephone network (PSTN)-based telephone calls, a method comprising:

detecting a presence of an incoming telephone call;

detecting an off-hook condition from the telephone;

receiving a sequence of signals generated by the telephone;

buffering at least a first signal generated by the telephone;

attempting to detect a predetermined signal that signifies a VoIP-based call;

intercepting subsequent signals in the sequence, absent the at least first signal that was buffered, and facilitating the VoIP-based call via an internet when the predetermined signal is detected; and signaling, via and audible tone, a user of the telephone during the VoIP-based call of the presence of a telephone call, the audible tone having a first ringing cadence when the telephone call is a VoIP-based call and the audible tone having a second ringling cadence when the telephone call is a PSTN-based call.

2. The method according to claim 1 wherein the incoming telephone call is a VoIP-based call.

3. The method according to claim 1 wherein the incoming telephone call is a PSTN-based call.

4. The method according to claim 1 further comprising ringing the telephone via the internet when an electronic mail message arrives at a mailbox.

5. The method according to claim 1 further comprising, when the predetermined signal is not detected that signifies a VoIP-based call:

determining that a telephone call is being made;

transmitting the sequence of signals generated by the telephone to a PSTN;

detecting a presence of an incoming VoIP-based call having Internet Protocol address information; and signaling a user of the telephone during the telephone call of the presence of the incoming VoIP-based call.

6. The method according to claim 5 further comprising:

translating the Internet Protocol address information into a format compatible for caller identification to create VoIP caller identification information; and presenting to the user of the telephone the VoIP caller identification information.

7. The method according to claim 6 wherein the step of presenting to the user of the telephone occurs at the time of signaling the user of the telephone during the telephone call of the presence of the incoming VoIP-based call.

8. The method according to claim 1 wherein the telephone is cordless.

* * * * *